United States Patent Office 3,277,363
Patented Oct. 4, 1966

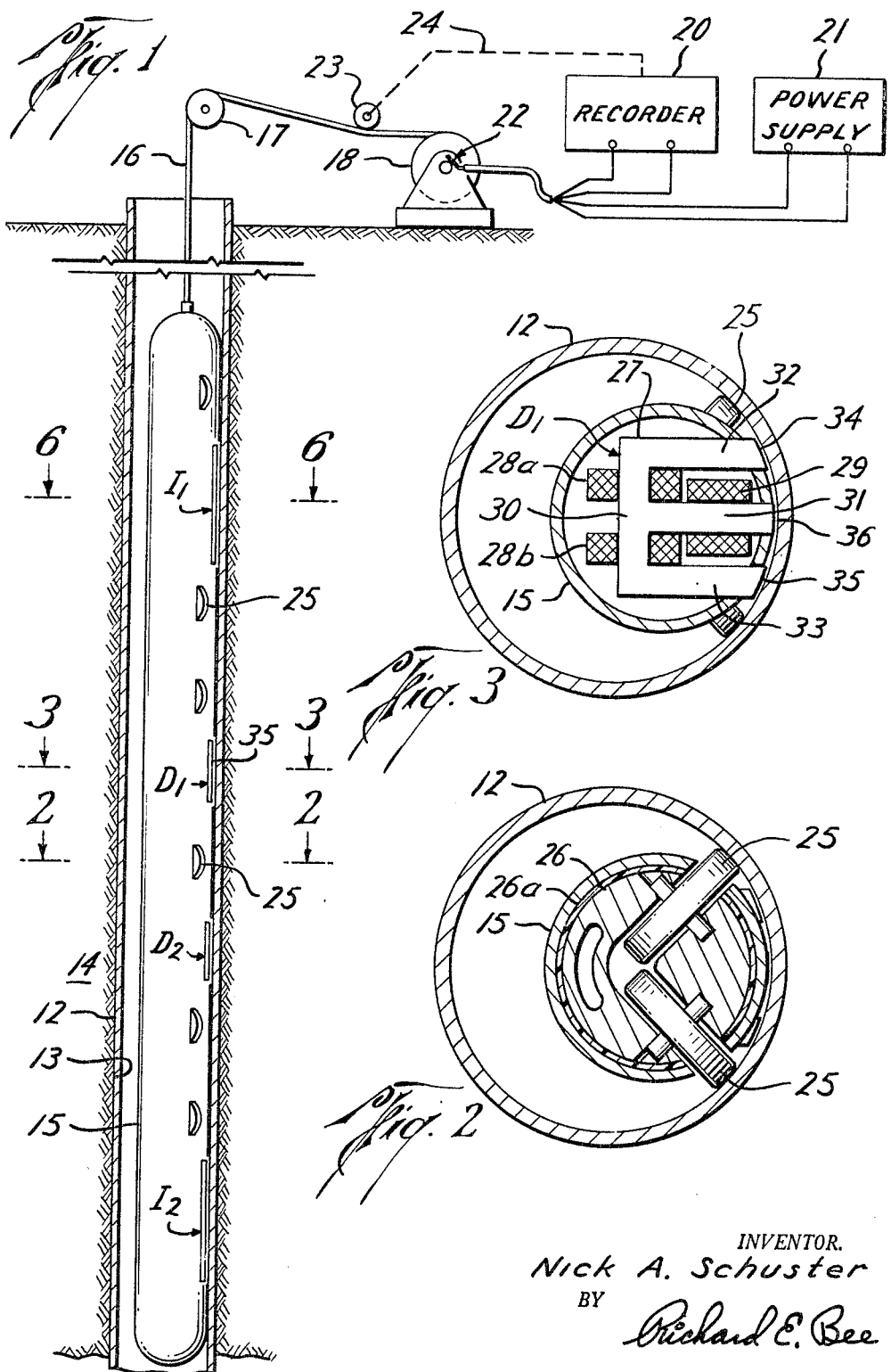

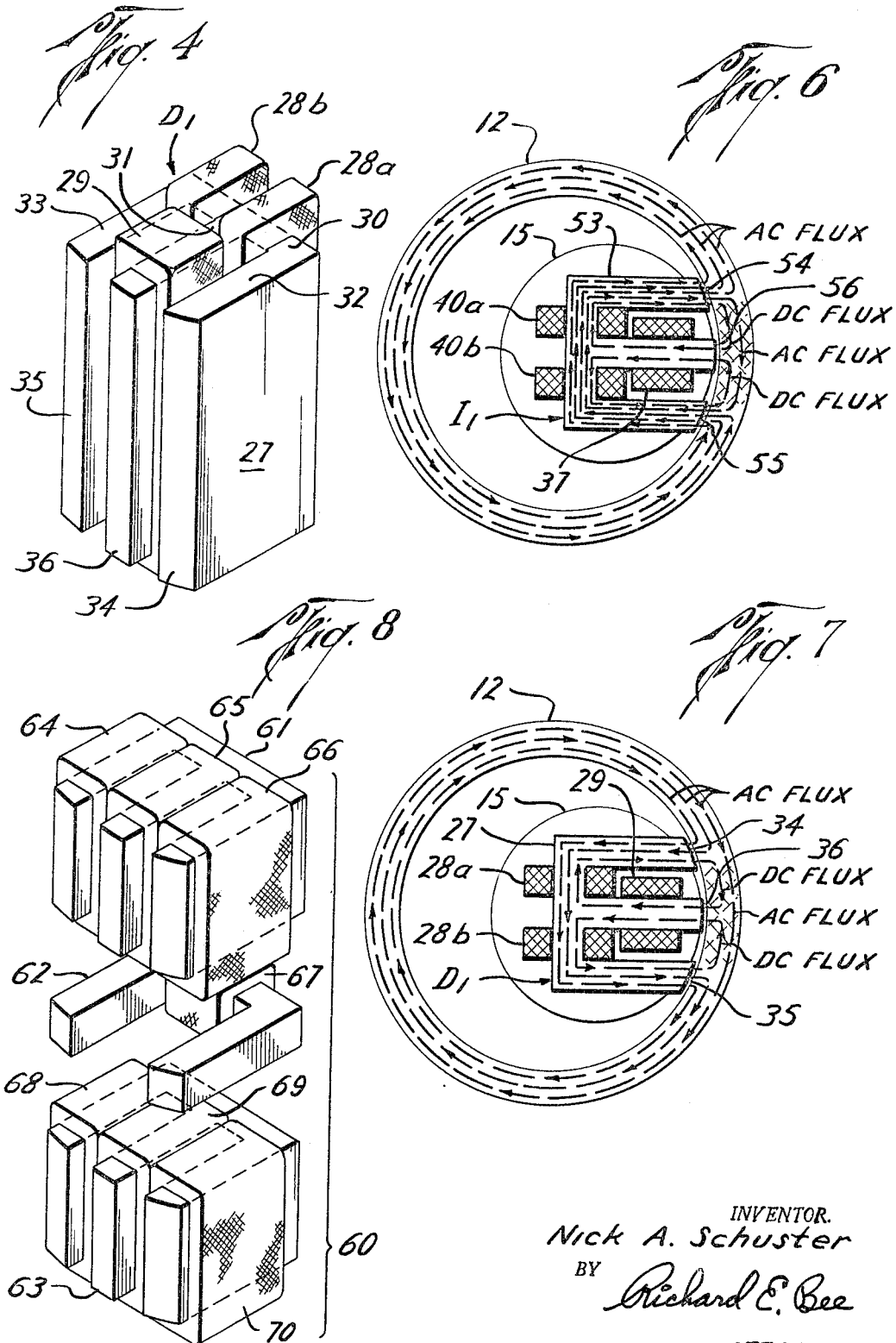

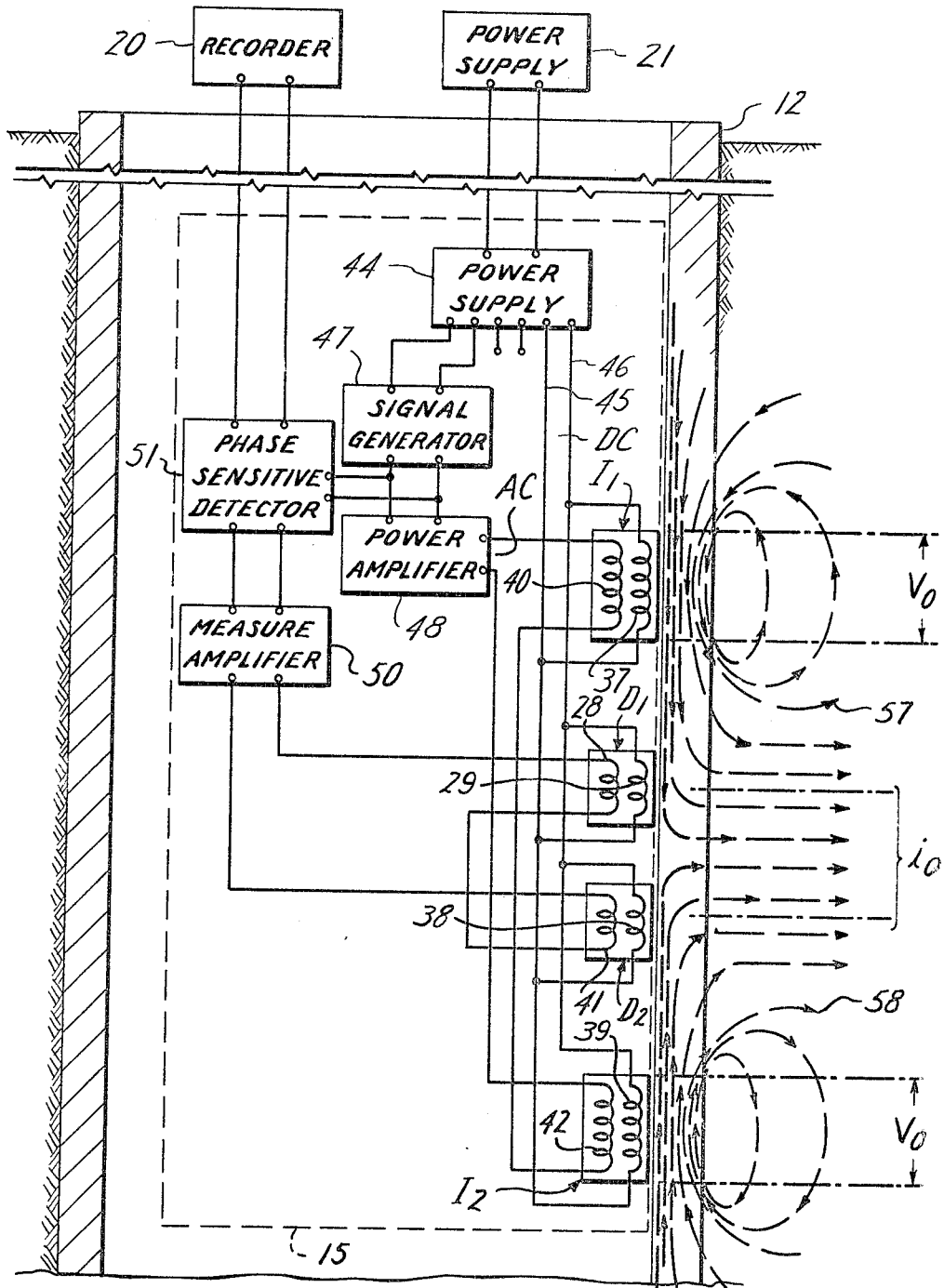

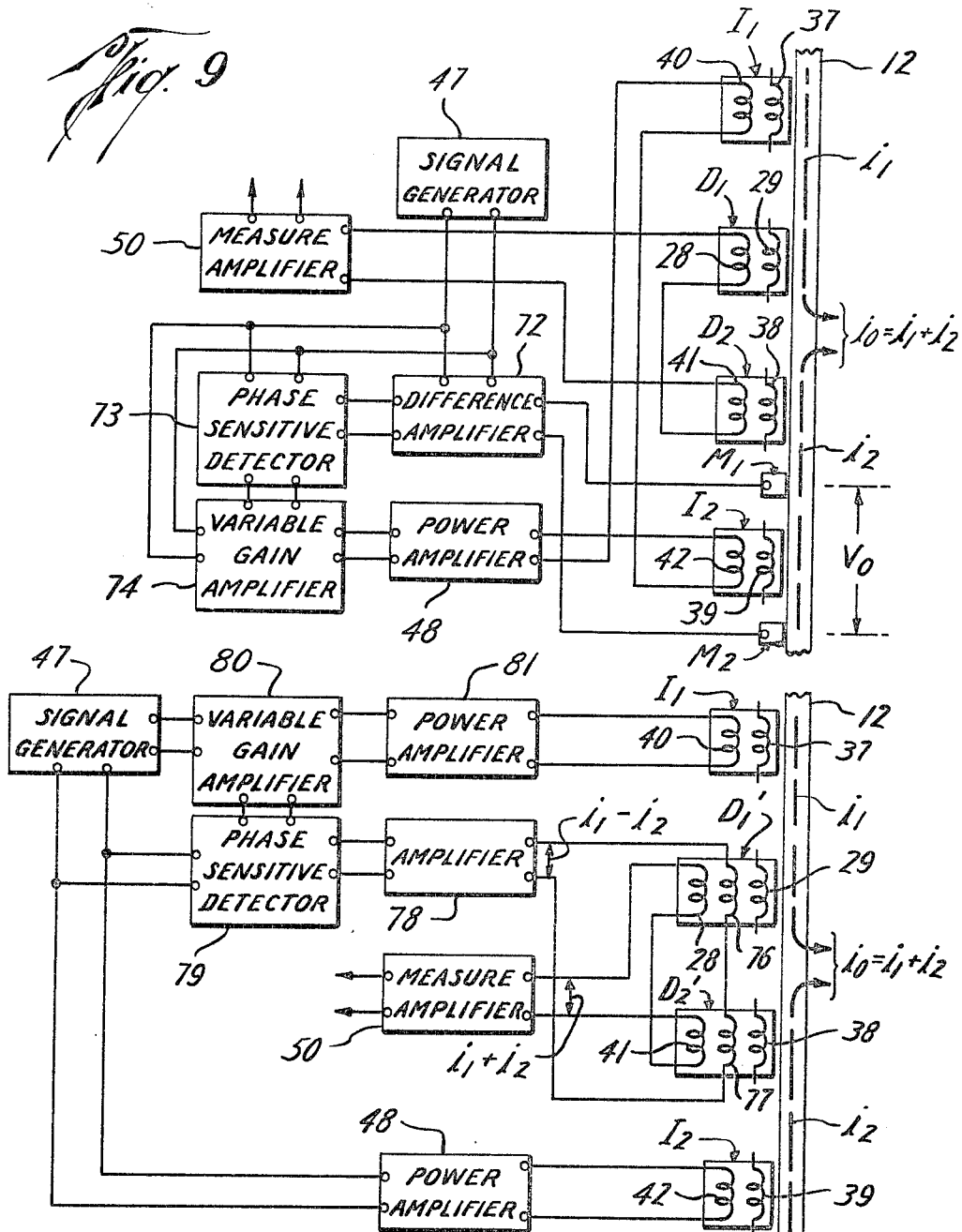

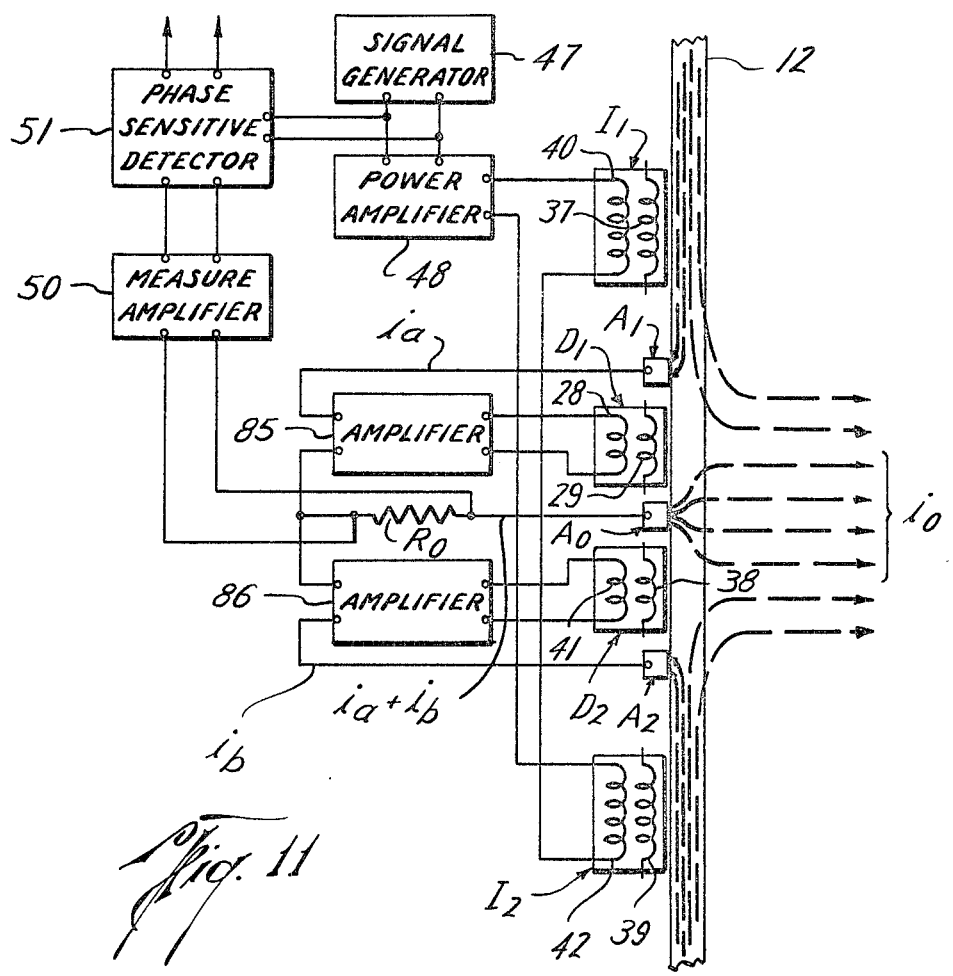

3,277,363
BOREHOLE INVESTIGATING METHOD AND APPARATUS UTILIZING MAGNETIC-FLUX FIELDS INDUCED IN A CASING PIPE LINING THE BOREHOLE
Nick A. Schuster, Houston, Tex., assignor to Schlumberger Well Surveying Corporation, Houston, Tex., a corporation of Texas
Filed Jan. 23, 1961, Ser. No. 84,271
29 Claims. (Cl. 324—1)

This invention relates to electrical methods and apparatus for investigating subsurface earth formations penetrated by a borehole and, particularly, to methods and apparatus for investigating the electrical characteristics of material exterior to the casing pipe of a cased borehole.

It has become fairly common practice in the past twenty years to obtain records or logs of the electrical resistivity or conductivity values of the earth formations penetrated by a borehole drilled into the earth. Such logs are useful in determining the nature, extent and depth of the various types of subsurface formations. This information is particularly useful in the case of oil well and gas well boreholes in that it enables the presence and depth of any oil-bearing or gas-bearing strata to be determined.

These so-called "electrical logs" are obtained by moving either a system of electrodes or a system of induction coils through the borehole and, at the same time, making a continuous record of the resistivity or conductivity values measured by the system. At the present time, these electrical logs are obtained on a commercial basis for only uncased boreholes. In other words, these electrical logs are run either at some intermediate stage in the drilling operation or shortly after the drilling operation is completed and, in any event, before casing pipe is set in the borehole. The difficulty of obtaining an electrical log after the casing pipe is placed in the borehole is readily apparent. This casing pipe, which serves to line the borehole for production purposes, is composed of metal, usually steel, having a thickness of approximately ½ inch. Consequently, it constitutes a highly effective electrical shield or electrical barrier for preventing the electrode or coil system from emitting or inducing current flow in the surrounding earth formations. As a result, the presently used forms of electrode and coil systems are incapable of making the desired measurements in a cased borehole.

There exists, nevertheless, a very great need for logging the electrical resistance characteristics of the formation material adjacent cased boreholes. In the first place, many of the older oil and gas wells, especially those drilled more than twenty years ago, were never electrically logged before they were cased. Their production has since either dropped below an economically practical level or else ceased altogether. The question then arises as to whether there might be oil-bearing or gas-bearing horizons at some intermediate depth in the borehole. Because of the fact that the borehole is already cased, this is very difficult to determine and is usually done on a trial-and-error basis by perforating the casing and obtaining fluid samples at different levels selected largely on the basis of educated guesses. Also at the present time, it is a frequent practice in proven oil fields to minimize expenses by drilling to a known oil-bearing level and setting casing pipe without running an electrical log. As before, when the production ceases to be economically feasible, the question again arises as to whether producible horizons exist at intermediate depths in the borehole.

At least one method has been heretofore proposed for obtaining an electrical log in a cased borehole. It involved the use of a series of scratcher-type electrodes which were urged into mechanical engagement with the inner wall of the casing pipe. Electrical current was then passed between a pair of these electrodes and thus through a section of the casing pipe. The resulting voltage drop in the casing pipe placed a part of this section at a higher electrical potential than the surrounding earth formations. This, in turn, caused current to flow from the exterior of the casing pipe into the adjacent earth formation. A second pair of scratcher electrodes was then used to obtain a measure of this current flow and, consequently, of the conductivity of the adjacent formation material.

To date, this scratcher electrode method has not been used on a commercial basis. It suffers from several serious drawbacks. In the first place, it is difficult to prevent extraneous variations in the electrode contact resistance because of variations in the degree of contact between the electrodes and the casing pipe. This is especially true where the electrodes are being moved through the casing pipe in a continuous manner in order to obtain a continuous record or log. Also, the electrode method suffers from a lack of efficiency and sensitivity. This is because the relatively high electrical conductivity of the casing pipe requires that a fairly substantial electrical current be passed through the casing before a practical amount of voltage drop can be produced therein. Also, the current flow which it is desired to measure is detected by measuring the voltage drop in the casing pipe intermediate the measure electrodes. The high conductivity of the casing pipe, however, causes this detected voltage to be extremely small in value. A further problem is that if the electrodes are moved in a continuous manner, then substantial amounts of electrical noise are generated by the friction of the electrodes with the casing pipe. This is particularly troublesome in view of the fact that the detected signal is, in the first place, relatively weak.

It is an object of the invention, therefore, to provide new and improved methods and apparatus for measuring the electrical resistance properties of the material exterior to the casing pipe of a cased borehole.

It is another object of the invention to provide new and improved investigating methods and apparatus for cased boreholes which largely overcome the problems and uncertainties involved in the previously proposed electrode method.

It is a further object of the invention to provide new and improved investigating apparatus for cased boreholes having greater sensitivity and increased efficiency of operation.

It is an additional object of the invention to provide new and improved investigating apparatus for cased boreholes which provides an improved signal-to-noise ratio, especially in obtaining continuous measurements by continuous movement of the apparatus through the casing pipe.

In accordance with one feature of the present invention, at least one alternating potential difference is induced in the casing pipe by electromagnetically inducing alternating magnetic flux in the casing pipe over a given length thereof and by electromagnetically altering the permeability of a portion of the casing pipe in this given length for controlling the alternating flux pattern for producing a net alternating potential difference intermediate the longitudinal extremities of this given length.

In accordance with another feature of the invention, the flow of any alternating current in the casing pipe is detected by electromagnetically altering the permeability of a portion of the casing pipe at a given location therealong for deflecting a portion of the alternating magnetic flux associated with any such alternating current flow in the casing pipe at this location into the interior region enclosed by such pipe and by detecting the magnitude of any such deflected flux. Taken individually, either of these features affords a substantial improvement in the efficiency or sensitivity of the measurement. By combining these features, an even further improvement is obtained.

For a better understanding of the present invention, together with other and further objects thereof, reference is had to the following description taken in connection with the acompanying drawings, the scope of the invention being pointed out in the appended claims.

Referring to the drawings:

FIG. 1 illustrates in a partly schematic manner a representative embodiment of apparatus constructed in acordance with the present invention;

FIG. 2 is a cross-sectional view taken along the section line 2—2 of FIG. 1;

FIG. 3 is a cross-sectional view taken along the section line 3—3 of FIG. 1;

FIG. 4 is an isometric view of a portion of the FIG. 1 apparatus;

FIG. 5 is a circuit diagram, partly schematic, of a representative embodiment of circuits for operating the FIG. 1 apparatus;

FIGS. 6 and 7 are simplified cross sections of portions of the FIG. 1 apparatus and are used in explaining the operation thereof;

FIG. 8 is an exploded isometric view of a modified form of structure which may be used in the FIG. 1 apparatus; and FIGS. 9, 10 and 11 are circuit diagrams illustrating modified embodiments of portions of the FIG. 5 circuits.

Referring to FIG. 1 of the drawings, there is shown a representative embodiment of apparatus constructed in accordance with the present invention for investigating the material exterior to a length of casing pipe 12 lining a borehole 13 extending into the earth 14. The casing pipe 13 is composed of metallic material, such as steel, and for simplicity of illustration it is indicated in a cross-sectional manner in FIG. 1. The interior region enclosed by the casing pipe 12 may be either empty or else filled with a liquid which may be either conductive or non-conductive in nature. The downhole portion of the investigating apparatus includes an instrument housing 15 adapted to be moved through the interior of the casing pipe 12. The outer portion of this instrument housing 15 is constructed of a non-magnetic material which is also either non-conductive or else coated on the exterior with a layer of non-conductive material. This instrument housing 15 is suspended from the surface of the earth by way of an armored multiconductor cable 16 which, at the surface of the earth, passes over a pulley or sheave 17 and then to a suitable drum and winch mechanism 18. Also located at the surface of the earth are a recorder 20 and a power supply 21. These units 20 and 21 are electrically connected to various ones of the individual conductors within the cable 16 by way of a suitable brush and slip ring arrangement 22 associated with the drum and winch mechanism 18. The recorder 20 may be of the multiunit recording galvanometer type and the recording medium thereof is advanced in synchronism with movement of the instrument housing 15 through the casing pipe 12 by way of the mechanical linkage indicated schematically by measuring wheel 23 and dash line interconnection 24.

In order to facilitate movement of the instrument housing 15 through the casing pipe 12, the instrument housing 15 includes a series of rollers 25 which protrude from suitable slots in the surface thereof to engage the inner wall of the casing pipe 12. The manner of construction of these rollers 25 is indicated in greater detail in the cross-sectional view of FIG. 2. As there shown, for the 2—2 level of FIG. 1, a pair of rollers 25 are mounted in a mounting block 26 which is mechanically secured to the interior of the instrument housing 15, but is electrically insulated therefrom by a layer of non-conductive material 26a. If non-conductive rollers are used, this insulation material 26a can be omitted.

The instrument housing 15 of FIG. 1 also includes an array of four longitudinally spaced-apart electromagnetic transducers $I_1$, $D_1$, $D_2$ and $I_2$ which are mounted in the interior thereof and, thus, adapted for movement through the casing pipe 12 for investigating the material exterior thereto. The two outermost transducers of the array, namely, the transducers $I_1$ and $I_2$, function as voltage-inducing or current-inducing transducers and, consequently, will be referred to as "inducers." The two inner transducers $D_1$ and $D_2$, on the other hand, function as current-detecting transducers and, hence, will be referred to as "detectors." As will be seen, all of these transducers have an identical form of physical construction, the difference in operating functions being achieved by differences in the operating circuits connected thereto. These transducers are longitudinally spaced apart along the instrument housing 15 such that the point midway between the two inner transducers $D_1$ and $D_2$ is coincident with the point midway between the two outer transducers $I_1$ and $I_2$.

Considering first the detector $D_1$, the construction thereof is shown in greater detail in the cross-sectional view of FIG. 3. As there shown, the detector $D_1$ includes a ferromagnetic core structure 27 having alternating current windings 28a and 28b and unidirectional current winding 29 located thereon. An isometric view of the core structure 27 together with the coil windings is shown in FIG. 4. As seen in either FIG. 3 or FIG. 4, the core structure 27 is in the form of an elongated E-shaped core having the alternating current windings 28a and 28b wound around the back side 30 of the "E" and the unidirectional current winding 29 wound around the center leg 31 of the "E." The open ends of outer legs 32 and 33 of the E-shaped core form pole faces 34 and 35, respectively, while the open end of the center leg 31 forms a center pole face 36. As seen in FIG. 3, the outer two pole faces 34 and 35 define an included angle of less than 180° with respect to the inner circumference of the casing pipe 12. The pole faces 34, 35 and 36 are contoured to provide a constant spacing between such pole faces and the inner wall of the casing pipe 12, this spacing or separation being maintained by means of the rollers 25. In this manner, an air gap of constant width is provided intermediate each of the pole faces and the pipe wall. The width of these air gaps should be small so that a minimum of drop in magnetomotive force will occur thereacross. A spacing of 0.05 inch is suitable for this purpose. The E-shaped core is preferably composed of a stack of thin E-shaped ferromagnetic laminations.

The other transducers of the FIG. 1 apparatus, namely, the inducers $I_1$ and $I_2$ and the detector $D_2$, are identical in construction to the detector $D_1$ just described, except that the E-shaped cores of the inducers $I_1$ and $I_2$ have a longitudinal length which is about twice the longitudinal length of the detectors $D_1$ and $D_2$. Also, the coil windings of the inducers may contain a different number of turns than those of the detectors. As compared to one another, however, the two inducers $I_1$ and $I_2$ should, as nearly as possible, be exactly identical in order to insure that the potential differences induced thereby are substantially equal.

Referring now to FIG. 5 of the drawings, there is shown suitable electrical circuits for operating the inducers and detectors of the FIG. 1 apparatus. Elements corresponding to those already discussed are given the same reference numerals, the instrument housing 15 being indicated in a schematic manner by the correspondingly designated dash-line box. The inducers $I_1$ and $I_2$ and detectors $D_1$ and $D_2$ are also indicated in a schematic manner with only the coil windings thereof being shown in detail. Also, for simplicity, the two alternating current coil windings 28a and 28b of the detector $D_1$, which coil windings are interconnected in a series aiding manner, are indicated in FIG. 5 by a single coil winding 28. As indicated in FIG. 5, the inducer $I_1$, the detector $D_2$ and the inducer $I_2$ include unidirectional current windings indicated by coil windings 37, 38 and 39, respectively. These transducers likewise include alternating current windings indicated by coil windings 40, 41 and 42, respectively. As for the detector $D_1$, these alternating current coil windings 40, 41 and 42 are actually composed of a pair of separate coil portions connected in a series aiding manner.

The electrical circuits shown in FIG. 5 include circuit means for energizing the unidirectional current windings 29, 37, 38 and 39 with unidirectional current for altering the permeability of portions of the casing pipe 12 located adjacent each of the transducers $I_1$, $D_1$, $D_2$ and $I_2$. This circuit means includes a downhole power supply 44 which is responsive to alternating electrical energy sent from the surface power supply 21 to develop the requisite direct-current voltages required by the downhole circuit components. In particular, direct-current voltage is developed by the power supply 44 and supplied thereby to a pair of conductors 45 and 46 to which the various unidirectional current windings 29, 37, 38 and 39 are connected in a parallel manner.

The electrical circuits of FIG. 5 also include circuit means for energizing the alternating current windings 40 and 42 of the two outer transducers $I_1$ and $I_2$ with alternating current for producing in the casing pipe 12 adjacent each of these transducers $I_1$ and $I_2$ a longitudinal flow of alternating current. This circuit means includes a signal generator 47 which is energized by the power supply 44 to develop an appropriate alternating-current output voltage. This output voltage, in turn, serves to actuate a power amplifier 48 which then develops an alternating output current which is supplied to the alternating current windings 40 and 42 in a series manner. These windings 40 and 42 are connected to the power amplifier 48 with opposite polarities so that the corresponding currents in the casing pipe 12 will be oppositely directed relative to one another, that is, will flow in opposite directions along the casing pipe 12. Also, the signal generator 47 and the power amplifier 48 are constructed so that the peak magnitude of the alternating current supplied to the coil windings 40 and 42 remains substantially constant.

The FIG. 5 circuits further include circuit means coupled to the alternating current windings 28 and 41 of the two inner transducers $D_1$ and $D_2$ for providing indications of the alternating signals induced therein by the alternating currents flowing in the casing pipe 12 adjacent these transducers $D_1$ and $D_2$. This circuit means includes a measure amplifier 50, the input terminals of which are coupled to the alternating current windings 28 and 41 in a series manner such that the total signal supplied to the input of amplifier 50 reperesents the sum of the alternating signals induced in the two windings 28 and 41. The amplified signal appearing at the output terminals of the measure amplifier 50 is then supplied to a phase-sensitive detector 51 which serves to rectify this signal to develop a direct-current output signal which is directly proportional to the peak amplitude thereof. To this end, the phase-sensitive detector 51 is also actuated by a phase-reference signal from the signal generator 47. The direct-current output signal from the phase-sensitive detector 51 is then supplied to the recorder 20 located at the surface of the earth.

Considering now the operation of the apparatus thus far described, as the instrument housing 15 is moved through the interior of the casing pipe 12, the power supply 44 is operative to supply unidirectional current to the unidirectional current windings 29, 37, 38 and 39 of the transducers $I_1$, $D_1$, $D_2$ and $I_2$. As a consequence, each of the transducers behaves like an electromagnet and, hence, pulls the instrument housing 15 towards the wall of the casing pipe 12, actual contact being prevented by the presence of the rollers 25. At the same time, the signal generator 47 and power amplifier 48 are operative to supply alternating current to the alternating current windings 40 and 42 of the inducers $I_1$ and $I_2$. Considering first the operation of the upper inducer $I_1$, an understanding of such operation will be faciiltated by referring to FIG. 6 as well as FIG. 5. FIG. 6 corresponds to a cross-section taken along the section line 6—6 of FIG. 1, except that some of the details are omitted and the width of the casing pipe 12 is somewhat exaggerated. The core structure of the inducer $I_1$ is designated in FIG. 6 by reference numeral 53 and the pole faces thereof are designated by reference numerals 54, 55 and 56.

Considering, then, both FIGS. 5 and 6, the unidirectional current supplied to the winding 37 of inducer $I_1$ serves to produce unidirectional or direct-current flux in the core structure 53, which flux follows the paths indicated in FIG. 6. In particular, these direct-current flux paths are completed by way of the shorter circumferential portion of the casing pipe 12 intermediate the two outer pole faces 54 and 55. The magnitude of this unidirectional current is selected so as to afford a substantial change in the permeability of this shorter portion of the casing pipe 12 intermediate the pole faces 54 and 55 and, particularly, in the portion thereof adjacent the center pole face 56. The shaded area of FIG. 6 indicates this region of altered permeability. In most cases, it is desired that the magnitude of this unidirectional current be selected so as to actually saturate the portion of the casing pipe 12 adjacent the center pole face 56, though in some cases satisfactory operation can be obtained with a lesser change in permeability than that occurring when this portion is driven to saturation. This depends on the shape of the magnetization curve and the relative permeability values of the particular casing pipe material being encountered as well as the frequency and amplitude of the alternating current being supplied to the alternating current winding portions 40a and 40b. For the present explanation, however, it will be assumed that the casing pipe region adjacent the center pole face 56 is driven well into saturation. The legs of the core structure 53, on the other hand, are preferably composed of a suitable magnetic material and suitably dimensioned so that the core structure 53, itself, is not driven into saturation. This is particularly true of the two outer legs as well as the back side of the core, which core portions must also carry alternating current flux.

The alternating current supplied to the coil winding 40 of FIG. 5 or, in other words, to the coil winding portions 40a and 40b of FIG. 6 serves to produce alternating magnetic flux in the core structure 53 and the casing pipe 12 as illustrated in FIG. 6. The coil portions 40a and 40b are connected in a series aiding manner so as to produce alternating flux in the same direction in the back side of the core. Now, because the shaded portion of the casing pipe 12 intermediate the pole faces 54 and 55 is highly saturated, its reluctance is also quite high, approaching that of free space. In other words, the shaded portion of the casing pipe 12 tends to behave like an air gap for the alternating flux. Consequently, the greater portion of this alternating flux follows the longer circumferential path formed by the remainder of the casing pipe. These circumferential lines of alternating flux around the longer or major portion of the casing pipe, in turn, produce an alternating potential difference in the casing pipe 12 in a longitudinal direction. This alternating potential difference is indicated in FIG. 5 by the symbol $V_0$. As shown in FIG. 5, this alternating potential difference $V_0$ produces a longitudinal flow of alternating current in the casing pipe 12 in the region adjacent the inducer $I_1$, which current then flows outwardly into the adjacent earth formations and is returned by way of such formations to the casing pipe 12 on the opposite side of the inducer $I_1$, thus completing the current flow circuit. This current flow is indicated schematically by the current flow lines 57.

In a similar manner, the lower inducer $I_2$, which is identical in construction to the upper inducer $I_1$ and is energized by the same alternating current, also develops an alternating potential difference $V_0$ in the casing pipe 12 intermediate the longitudinal extremities of this inducer $I_2$. This likewise produces a flow of alternating current through the casing pipe 12 and out into the adjacent earth formation and back to the casing pipe 12. This current flow is indicated schematically by current flow lines 58. This current flow 58 is similar to the current flow 57 produced by the upper inducer $I_1$ except that the portion thereof which flows in the casing pipe 12 is directed in the opposite direction. In this manner, the currents from the two inducers $I_1$ and $I_2$ oppose one another in the region intermediate these inducers. This, in turn, causes the current flow in the region midway between the inducers to be directed in a generally perpendicular manner away from the casing pipe 12 and into the adjacent earth formations. This perpendicular current will eventually diverge and return to the casing pipe 12, but the magnitude thereof is determined primarily by the electrical resistance characteristics of the formation material in the region where the current density is the greatest, namely, in that region immediately adjacent the casing pipe wherein these current flow lines are substantially perpendicular to the casing. Note that this current flow from the casing pipe 12 occurs all the way around the circumference of such casing pipe and not just from one side thereof as indicated by the schematic representation of FIG. 5.

The currnt flow portion of particular interest in determining the electrical resistance characteristics of the material exterior to the casing pipe 12 is that portion of the current which escapes from the casing pipe 12 intermediate the detectors $D_1$ and $D_2$. The total current leaving the casing pipe 12 intermediate these detectors is designated by the symbol "$i_0$." The relationship between this current flow "$i_0$," the alternating potential difference $V_0$ and the conductivity "C" of the material exterior to the casing pipe 12 may b described mathematically by the following expression:

$$i_0 = kV_0C$$

where "k" denotes a proportionality constant which depends primarily on the physical dimensions and the relative spacings between the transducers.

What is required, then, is to maintain the potential difference $V_0$ substantially constant and to measure the total current "$i_0$" to obtain a signal which is directly proportional to the conductivity "C" of the material exterior to the casing pipe 12. As indicated, the signal generator 47 and power amplifier 48 are constructed to supply a substantially constant magnitude of current to the alternating current windings 40 and 42 of the inducers $I_1$ and $I_2$. This maintains the corresponding $V_0$ potential differences substantially constant. The two detectors $D_1$ and $D_2$ then serve to produce an output signal which is proportional to the current flow "$i_0$" leaving the casing pipe 12 intermediate these detectors.

The manner in which these detectors $D_1$ and $D_2$ operate will be explained for the case of the upper detector $D_1$ with the aid of the simplified cross-sectional view of FIG. 7 which corresponds to a cross section along the section line 3—3 of FIG. 1. As shown in FIG. 7, the unidirectional current supplied to the coil winding 29 serves to saturate the shorter portion of the casing pipe 12 located intermediate the two outer pole faces 34 and 35 by passing a large value of unidirectional or direct-current flux through this region. The reluctance of this portion of the casing pipe 12 is thus increased by a substantial factor so that this portion tends to behave much like an air gap. Consequently, a substantial portion of the circumferential alternating-current flux associated with the longitudinal flow of alternating current through the casing pipe 12 is deflected into the core structure 27 and caused to pass through the alternating current windings 28a and 28b thereof. This deflected flux induces alternating current signals in the coil windings 28a and 28b. Inasmuch as the coil portions 28a and 28b are connected in an additive manner, a total alternating signal is provided which is directly proportional to the magnitude of the alternating current flowing in the casing pipe 12 adjacent this transducer $D_1$. The lower detector $D_2$ operates in a similar manner to detect the magnitude of the alternating current flowing in the casing pipe 12 adjacent thereto.

As indicated in FIG. 5, the upper detector $D_1$ serves to measure the portion of the $i_0$ current flow produced by the upper inducer $I_1$ while the lower detector $D_2$ serves to measure the portion of the $i_0$ current flow produced by the lower inducer $I_2$. The alternating current windings 28 and 41 of the two detectors $D_1$ and $D_2$ are connected in an additive manner so as to produce a total output signal corresponding to the sum of the two alternating signals induced in the windings 28 and 41 and, thus, corresponding to the total $i_0$ current flow. This total output signal from the two detectors $D_1$ and $D_2$ is then supplied to the measure amplifier 50 and the phase-sensitive detector 51, the latter unit serving to rectify the total signal to produce a direct-current output signal which is proportional thereto. This direct-current output signal is then supplied to the recorder 20 located at the surface of the earth so as to provide a continuous record or log of the conductivity values of the material exterior to the casing pipe 12.

It should be noted that the use of these electromagnetic type transducers $I_1$, $D_1$, $D_2$ and $I_2$, together with the fact that these transducers are not in direct physical contact with the casing pipe 12, as indicated in FIG. 3, largely overcomes the problems and difficulties of contact resistance variations and the like encountered in the case of electrode devices which require direct mechanical contact with the casing pipe. Also, the fact that the inducers $I_1$ and $I_2$ operate on electromagnetic principles enables relatively large values of alternating potential difference to be produced in selected portions of the casing pipe. This is because no reliance is placed on a voltage drop across the internal resistance of the casing pipe to produce the required potential difference. Likewise, for the detectors $D_1$ and $D_2$, the reliance on electromagnetic action, as opposed to internal voltage drops, serves to produce more sensitive and accurate detector action as well as larger magnitude output signals.

Referring now to FIG. 8 of the drawings, there is shown a modified form of transducer construction which is particularly useful for the detecting transducers. This modified transducer is shown in an exploded manner in FIG. 8 and, as thus seen, includes a ferromagnetic core structure 60 having three spaced-apart core members 61, 62 and 63. The upper core member 61 is of E-shaped construction and includes on the three legs thereof three unidirectional current windings 64, 65 and 66. The center core member 62 is of C-shaped construction and includes a single alternating current coil winding 67 on the back side thereof. The lower core member 63 is similar to the upper core member 61 and, consequently, is likewise of E-shaped construction and includes three unidirectional current windings 68, 69 and 70 wound around the legs thereof. In use, the three core members 61, 62 and 63 are mounted one on top of the other and as closely to each other as possible, except that the magnetic portions of the core members are physically separated from one another by some type of non-magnetic material.

While this particular type of transducer construction may be used for any of the transducers $I_1$, $D_1$, $D_2$ and $I_2$ of FIG. 1, it is particularly useful for the detecting transducers $D_1$ and $D_2$. Assuming, then, that it is utilized as a detecting transducer, the six unidirectional current windings 64–66 and 68–70 are energized with unidirectional current to saturate the casing pipe region adjacent the center poles of the E-shaped core members 61 and 63. Because of the close spacing with the C-shaped core member 62, this serves to deflect alternating current flux into such C-shaped core member to produce in the alternating current winding 67 the desired output signal. An advantage of this form of transducer construction is that no unidirectional or direct-current flux is passed through the alternating-current coil winding 67. As a consequence, false signals will not be induced in the alternating current winding 67 if undesired variations in the width of the air gap intermediate the pole faces and the inner wall of the casing pipe produce undesired variations in the magnitude of the direct-current flux.

Referring now to FIG. 9 of the drawings, there is shown a circuit modification for a portion of the FIG. 5 circuits which serves to insure that the $V_0$ potential difference induced in the casing pipe 12 by the inducers $I_1$ and $I_2$ is maintained more nearly constant under adverse conditions where this potential difference tends to be subject to undesired variations. Only the parts of the FIG. 5 circuits most pertinent to this modification have been reproduced in FIG. 9. In particular, the supply circuit connections for the unidirectional current windings 29, 37, 38 and 39 have been omitted for the sake of simplicity, it being clearly understood that these windings are nevertheless energized with unidirectional current in the manner indicated in FIG. 5. In order to insure that the $V_0$ potential differences are held substantially constant, the apparatus shown in FIG. 9 includes a pair of electrodes $M_1$ and $M_2$ individually positioned on opposite sides of one of the two outer transducers, namely, on opposite sides of the lower transducer $I_2$. These electrodes are adapted to mechanically contact the inner wall of the casing pipe 12. Consequently, the alternating potential difference monitored between these electrodes $M_1$ and $M_2$ will be directly proportional to the induced alternating potential difference $V_0$. If this monitored voltage is constant, then the induced potential difference $V_0$ will likewise be constant.

In order to achieve this result, the apparatus of FIG. 9 also includes circuit means responsive to the alternating potential difference produced in the casing pipe intermediate the electrodes $M_1$ and $M_2$ for adjusting the magnitude of the alternating current supplied to the intervening transducer, namely, the inducer $I_2$, for maintaining this potential difference substantially constant. This circuit means includes a difference amplifier 72 to one pair of input terminals of which is applied the monitored $M_1$–$M_2$ voltage. To a second pair of input terminals of the difference amplifier 72 is supplied an alternating-current reference signal of constant magnitude, this reference signal being supplied by the signal generator 47. The difference between this reference signal and the monitored $M_1$–$M_2$ signal is then supplied to a phase-sensitive detector 73 which, under the control of a phase-reference signal from the signal generator 47, serves to rectify this difference signal to provide at the output of the phase-sensitive detector 73 a direct-current control signal which is proportional to the difference signal. This direct-current control signal is then applied to the gain control terminals of a variable gain amplifier 74 which is connected in cascade intermediate the signal generator 47 and the power amplifier 48. This control signal serves to adjust the gain of the variable gain amplifier 74 so as to adjust the magnitude of the alternating-current signal applied to the power amplifier 48 which, in turn, adjusts the magnitude of the alternating current supplied to the coil winding 42. This adjustment continues until the monitored $M_1$–$M_2$ voltage becomes substantially equal to the reference signal supplied to the difference amplifier 72. This reference signal is selected to have a magnitude corresponding to the desired value of the $V_0$ potential difference. Consequently, the degenerative feedback action provided by the difference amplifier 72, the phase-sensitive detector 73 and the variable gain amplifier 74 serves to maintain the $M_1$–$M_2$ voltage and, hence, the $V_0$ potential difference substantially constant.

As shown in FIG. 9, the alternating current winding 40 of the upper inducer $I_1$ is also connected in series with the alternating current winding 42 of the lower inducer $I_2$. Consequently, the adjustment of the inducer alternating current also serves to adjust the $V_0$ potential difference of the upper inducer $I_1$ so as to keep it in step with the lower $V_0$ potential difference. If desired, separate control circuits and a separate pair of monitoring electrodes could be utilized for the upper inducer $I_1$. Also, it should be noted that the use of electrodes in the foregoing manner does not give rise to too much trouble because the monitored potential difference is large enough to provide an adequate signal-to-noise ratio for the control circuits.

Referring now to FIG. 10 of the drawings, there is shown another modification of the FIG. 5 circuits whereby the two current flow components forming the total $i_0$ current flow are accurately maintained substantially equal to one another. In this modification, modified forms of detector devices $D_1'$ and $D_2'$ are required. This modification consists of including a second set of alternating current coil windings on each of the core structures of the two detectors. These additional alternating current windings for the detectors $D_1'$ and $D_2'$ are indicated by the reference numerals 76 and 77, respectively. In each case, the core structure remains the same as before, with the two sets of alternating current windings being wound together in a bifilar manner or one on top of the other or else side by side with one another.

The control action for equalizing the $i_1$ and $i_2$ components of the total current $i_0$ is provided by interconnecting these additional detector windings 76 and 77 in a subtractive manner such that the net signal is representative of the difference of the alternating current signals induced in the individual windings 76 and 77. This $i_1$–$i_2$ difference signal is supplied to an amplifier 78 and then to a phase-sensitive detector 79. The phase-sensitive detector 79, under the control of a phase-reference signal supplied by the signal generator 47, serves to rectify the amplified difference signal to develop a direct-current control signal which is proportional to such difference signal. This direct-current control signal is then supplied to a variable gain amplifier 80 which is connected in cascade in the signal path intermediate the signal generator 47 and a second power amplifier 81. This control signal serves to adjust the gain of the variable gain amplifier 80 and, hence, the magnitude of the alternating current signal supplied to the power amplifier 81. Power amplifier 81 is connected to the alternating current winding 40 of the upper inducer $I_1$ so that these adjustments, in turn, adjust the magnitude of the alternating current induced in the case pipe 12 by the inducer $I_1$.

This degenerative feedback adjustment continues until the current flow component $i_1$ from the upper inducer $I_1$ becomes substantially equal to the current flow component $i_2$ from the lower inducer $I_2$. When this equality obtains, then the difference signal $i_1$–$i_2$ becomes zero and no further adjustment of the gain of variable gain amplifier 80 takes place. This control action is thus automatic in nature and serves to maintain the current component $i_1$ substantially equal to the current component $i_2$. This equality of the current flow components serves to prevent the occurrence of any appreciable longitudinal current flow component which passes directly up or down the casing pipe without flowing into the adjacent earth material intermediate the two inducers $I_1$ and $I_2$. This, in turn, increases the accuracy of measurement in that the detectors measure only the current components which are actually flowing outwardly into the material exterior to the casing pipe. The total $i_0$ output signal which is recorded is developed in the same manner as before by the first sets of alternating current windings 28 and 41, which windings are connected to the measure amplifier 50 in the manner previously indicated.

Referring now to FIG. 11 of the drawings, there is shown a circuit modification which enables the detectors $D_1$ and $D_2$ to operate as null-type devices and thereby render the absolute accuracy of the measurement less affected by variations in casing permeability, casing thickness, casing corrosion, and in the width of the air gap intermediate the detector devices and the inner wall of the casing pipe. As before, the unidirectional current windings 29, 37, 38 and 39 are energized with unidirectional current for saturating the portions of the casing pipe 12 located adjacent each of the transducers $I_1$, $D_1$, $D_2$ and $I_2$. For simplicity, these circuit connections to these coil windings have been omitted in this figure. In addition to the transducers $I_1$, $D_1$, $D_2$ and $I_2$, the apparatus of FIG. 11 also includes a center electrode $A_0$ positioned midway between the two inner transducers $D_1$ and $D_2$ and a pair of outer electrodes $A_1$ and $A_2$ individually positioned in a different one of the regions intermediate adjacent inner and outer transducers. All three of the electrodes $A_0$, $A_1$ and $A_2$ are adapted to mechanically contact the inner wall of the casing pipe 12.

The inducers $I_1$ and $I_2$ induce longitudinal current flow in the casing pipe 12 in opposite directions, as previously discussed. In FIG. 11, however, the alternating current coil winding 28 of the detector $D_1$ is, instead, connected to a high-gain amplifier 85, the output terminals of which are connected between the center electrode $A_0$ and the upper electrode $A_1$. If any longitudinal current flow occurs past the detector $D_1$, then an alternating signal is induced in the coil winding 28 and supplied thereby to the amplifier 85. The amplified output of this amplifier 85 is in the form of an alternating current component $i_a$ which is passed between the $A_0$ and $A_1$ electrodes. This current component $i_a$ is phased so as to oppose the longitudinal current flow component produced by the upper inducer $I_1$. The degenerative feedback action provided by the amplifier 85 serves to adjust the magnitude of this $i_a$ component until the net current flow in the casing pipe 12 past the detector $D_1$ becomes substantially zero. When this condition occurs, all of the $i_a$ current is flowing from the casing pipe 12 into the material exterior thereto in a perpendicular manner. This $i_a$ current is eventually returned to the casing pipe 12 and, by way thereof, to the upper electrode $A_1$. The detector $D_1$ thus indicates a null current condition in the adjacent part of the casing pipe.

The lower detector $D_2$ operates in a similar manner to energize a second high-gain amplifier 86 for passing a second current flow component $i_b$ between the $A_0$ and $A_2$ electrodes so as to oppose the longitudinal current flow produced by the lower inducer $I_2$. This $i_b$ component is automatically adjusted by the degenerative feedback action of amplifier 86 so as to cause the net current flow in the casing pipe adjacent the detector $D_2$ to become substantially equal to zero. Thus, the detector $D_2$ likewise indicates a null condition and the value of $i_b$ current required to produce this condition is proportional to the inducer $I_2$ current flow component which it is opposing.

An output signal for the apparatus of FIG. 11 is provided by means of a measure resistor $R_0$ located in circuit path which is common to both the $i_a$ and the $i_b$ current flow components. Consequently, this measure resistor $R_0$ develops a voltage drop thereacross which is proportional to the total current supplied to the $A_0$ center electrode, which current also represents the total current $i_0$ leaving the casing pipe 12 intermediate the detectors $D_1$ and $D_2$. The magnitude of this total current flow $i_0$ varies as the conductivity of the material exterior to the casing pipe 12 varies so that this $R_0$ voltage drop is proportional to the conductivity of such exterior material. This $R_0$ voltage signal is supplied to the measure amplifier 50 and the phase-sensitive detector 51, the latter unit being connected to the recorder at the surface of the earth in the manner indicated in FIG. 5. Because the net current flow past either of the detectors $D_1$ and $D_2$ is substantially zero, the effect on these detectors of variations in the permeability, thickness or degree of corrosion of the casing pipe 12 is of no consequence. Also, because the $i_a$ and $i_b$ current flow components are relatively small in magnitude, the contact resistances of the $A_0$, $A_1$ and $A_2$ electrodes is unimportant.

The various circuit modifications described in FIGS. 9, 10 and 11 may, where conditions require it, be utilized in combination with one another. Also, instead of holding the induced potential difference $V_0$ constant, this potential difference may be allowed to vary, in which case ratio circuits or devices may be used to obtain a measure of the ratio of the current flow $i_0$ to the potential difference $V_0$, this ratio then being proportional to the conductivity of the material exterior to the casing pipe.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of investigating the material exterior to a length of casing pipe lining a borehole extending into the earth comprising: inducing alternating magnetic flux in the casing pipe over a predetermined length thereof; electromagnetically altering the permeability of a portion of the casing pipe in this predetermined length for controlling the alternating flux pattern for producing a net alternating electrical potential difference intermediate the longitudinal extremities of this predetermined length; and detecting the flow of alternating current in the casing pipe caused by this potential difference at a location longitudinally spaced from this predetermined length.

2. A method of investigating the material exterior to a length of casing pipe lining a borehole extending into the earth comprising: inducing alternating magnetic flux in the casing pipe over a predetermined length thereof; saturating with unidirectional magnetic flux a portion of the casing pipe in this predetermined length for controlling the alternating flux pattern for producing a net alternating electrical potential difference intermediate the longitudinal extremities of this predetermined length; and detecting the flow of alternating current in the casing pipe caused by this potential difference at a location longitudinally spaced from this predetermined length.

3. A method of inducing longitudinal alternating electrical current flow in a length of casing pipe lining a borehole extending into the earth comprising: inducing alternating magnetic flux in a circumferential direction in a limited circumferential segment of the casing pipe over a given length thereof; and electro-magnetically altering the permeability of a portion of the casing pipe in this limited circumferential segment of said given length for controlling the alternating flux path for producing in the casing pipe a longitudinal flow of alternating electrical current away from said given length.

4. A method of investigating the material exterior to a length of casing pipe lining a borehole extending into the earth comprising: producing an alternating electrical potential difference in the casing pipe intermediate the longitudinal extremities of a given length thereof; electromagnetically altering the permeability of a portion of the casing pipe at a location longitudinally spaced from this given length for deflecting a portion of the alternating magnetic flux associated with any longitudinal alternating current flow in the casing pipe at this location into the interior region enclosed by such pipe; and detecting the magnitude of any such deflected flux.

5. A method of investigating the material exterior to a length of casing pipe lining a borehole extending into the earth comprising: producing an alternating electrical potential difference in the casing pipe intermediate the longitudinal extremities of a given length thereof; saturating with unidirectional magnetic flux a portion of the casing pipe at a location longitudinally spaced from this given length for deflecting a portion of the alternating magnetic flux associated with any longitudinal alternating current flow in the casing pipe at this location into the interior region enclosed by such pipe; and detecting the magnitude of any such deflected flux.

6. A method of detecting the flow of any alternating current in a length of casing pipe lining a borehole extending into the earth comprising: electromagnetically altering the permeability of a portion of the casing pipe at a given location therealong for deflecting a portion of the alternating magnetic flux associated with any longitudinal alternating current flow in the casing pipe at this location into the interior region enclosed by such pipe; and detecting the magnitude of any such deflected flux.

7. A method of investigating the material exterior to a length of casing pipe lining a borehole extending into the earth comprising: inducing alternating magnetic flux in the casing pipe over a given length thereof; electromagnetically altering the permeability of a portion of the casing pipe in this given length for controlling the alternating flux pattern for producing a net alternating electrical potential difference intermediate the longitudinal extremities of this given length; electromagnetically altering the permeability of a portion of the casing pipe at a location longitudinally spaced from this given length for deflecting a portion of the alternating magnetic flux associated with any longitudinal alternating current flow in the casing pipe at this location into the interior region enclosed by such pipe; and detecting the magnitude of any such deflected flux.

8. A method of investigating the material exterior to a length of casing pipe lining a borehole extending into the earth comprising: inducing alternating magnetic flux in the casing pipe over a given length thereof; saturating with unidirectional magnetic flux a portion of the casing pipe in this given length for controlling the alternating flux pattern for producing a net alternating electrical potential difference intermediate the longitudinal extremities of this given length; saturating with unidirectional magnetic flux a portion of the casing pipe at a location longitudinally spaced from this given length for deflecting a portion of the alternating magnetic flux associated with any longitudinal alternating current flow in the casing pipe at this location into the interior region enclosed by such pipe; and detecting the magnitude of any such deflecting flux.

9. A method of investigating the material exterior to a length of casing pipe lining a borehole extending into the earth comprising: inducing first and second alternating magnetic flux fields in the casing pipe over a pair of longitudinally spaced apart sections thereof; saturating with unidirectional magnetic flux a portion of the casing pipe in each of these sections for controlling the alternating flux patterns for producing in each of these sections a longitudinal flow of alternating current, these currents being oppositely directed relative to one another; and detecting the total flow of alternating current entering a portion of the casing pipe centrally located intermediate these sections.

10. A method of investigating the material exterior to a length of casing pipe lining a borehole extending into the earth comprising: producing a longitudinal flow of alternating current in the casing pipe in each of two longitudinally spaced apart sections thereof, these currents being oppositely directed relative to one another; saturating with unidirectional magnetic flux a portion of the casing pipe at each of two longitudinally spaced apart positions centrally located intermediate these sections for deflecting a portion of the alternating magnetic flux associated with the alternating current flow in the casing pipe at each of these positions into the interior region by such pipe; and detecting the magnitudes of these deflected flux portions.

11. A method of investigating the material exterior to a length of casing pipe lining a borehole extending into the earth comprising: inducing first and second alternating magnetic flux fields in the casing pipe over a pair of longitudinally spaced apart sections thereof; saturating with unidirectional magnetic flux a portion of the casing pipe in each of these sections for controlling the alternating flux patterns for producing in each of these sections a longitudinal flow of alternating current, these currents being oppositely directed relative to one another; saturating with unidirectional magnetic flux a portion of the casing pipe at each of two longitudinally spaced apart positions centrally located intermediate these sections for deflecting a portion of the alternating magnetic flux associated with the alternating current flow in the casing pipe at each of these positions into the interior region enclosed by such pipe; and detecting the magnitudes of these deflected flux portions.

12. Apparatus for investigating the material exterior to a length of casing pipe lining a borehole extending into the earth comprising: an array of four longitudinally spaced apart electromagnetic transducers adapted for movement through the casing pipe, each transducer including a ferromagnetic core structure having alternating and unidirectional current windings located thereon and having at least two pole faces adapted to be located next to the inner wall of the casing pipe; circuit means for energizing the unidirectional current windings with unidirectional current for altering the permeability of portions of the casing pipe located adjacent each transducer; circuit means for energizing the alternating current windings of the two outer transducers with alternating current for producing in the casing pipe adjacent each of these transducers a longitudinal flow of alternating current, these currents being oppositely directed relative to one another; and circuit means coupled to the alternating current windings of the two inner transducers for providing indications of the alternating electrical signals induced therein by the alternating currents flowing in the casing pipe adjacent these transducers.

13. Apparatus for investigating the material exterior to a length of casing pipe lining a borehole extending into the earth comprising: an array of four longitudinally spaced apart electromagnetic transducers adapted for movement through the casing pipe and having the point midway between the two inner transducers coincident with the point midway between the two outer transducers, each transducer including a ferromagnetic core structure having alternating and unidirectional current windings located thereon and having at least two pole faces adapted to be located next to the inner wall of the casing pipe; circuit means for energizing the unidirectional current windings with unidirectional current for altering the permeability of portions of the casing pipe located adjacent each transducer; circuit means for energizing the alternating current windings of the two outer transducers with alernating current for producing in the casing pipe adjacent each of these transducers a longitudinal flow of alternating current, these currents being oppositely directed relative to one another; and circuit means coupled to the alternating current windings of the two inner transducers for providing indications of the alternating electrical signals induced therein by the alternating currents flowing in the casing pipe adjacent these transducers.

14. Apparatus for investigating the material exterior to a length of casing pipe lining a borehole extending into the earth comprising: an array of four longitudinally spaced apart electromagnetic transducers adapted for movement through the casing pipe, each transducer including a ferromagnetic core structure having alternating and unidirectional current windings located thereon and having at least two pole faces adapted to be located next to the inner wall of the casing pipe; energizing circuit means connecting the unidirectional current windings in parallel for energizing these windings with unidirectional current for altering the permeability of portions of the casing pipe located adjacent each transducer; energizing circuit means connecting the alternating current windings of the two outer transducers in series for energizing these windings with alternating current for producing in the casing pipe adjacent each of these transducers a longitudinal flow of alternating current, these currents being oppositely directed relative to one another; and circuit means coupled to the alternating current windings of the two inner transducers for providing indications of the alternating electrical signals induced therein by the alternating currents flowing in the casing pipe adjacent these transducers.

15. Apparatus for investigating the material exterior to a length of casing pipe lining a borehole extending into the earth comprising: an array of four longitudinally spaced apart electromagnetic transducers adapted for movement through the casing pipe, each transducer including a ferromagnetic core structure having alternating and unidirectional current windings located thereon and having at least two pole faces adapted to be located next to the inner wall of the casing pipe; circuit means for energizing the unidirectional current windings with unidirectional current for altering the permeability of portions of the casing pipe located adjacent each transducer; circuit means for energizing the alternating current windings of the two outer transducers with alternating current of constant peak magnitude for producing in the casing pipe adjacent each of these transducers an alternating potential difference of constant peak magnitude, the currents produced in the casing pipe by these potential differences being oppositely directed relative to one another; and circuit means coupled to the alternating current windings of the two inner transducers for providing indications of the alternating electrical signals induced therein by the alternating currents flowing in the casing pipe adjacent these transducers.

16. Apparatus for investigating the material exterior to a length of casing pipe lining a borehole extending into the earth comprising: an array of four longitudinally spaced apart electromagnetic transducers adapted for movement through the casing pipe, each transducer including a ferromagnetic core structure having alternating and unidirectional current windings located thereon and having at least two pole faces adapted to be located next to the inner wall of the casing pipe; circuit means for energizing the unidirectional current windings with unidirectional current for altering the permeability of portions of the casing pipe located adjacent each transducer; circuit means for energizing the alternating current windings of the two outer transducers with alternating current for producing in the casing pipe adjacent each of these transducers a longitudinal flow of alternating current, these currents being oppositely directed relative to one another; and circuit means coupled to the alternating current windings of the two inner transducers for providing an indication of the sum of the alternating electrical signals induced therein by the alternating currents flowing in the casing pipe adjacent these transducers.

17. Apparatus for investigating the material exterior to a length of casing pipe lining a borehole extending into the earth comprising: an array of four longitudinally spaced apart electromagnetic transducers adapted for movement through the casing pipe, each transducer including a ferromagnetic core structure having alternating and unidirectional current windings located thereon and having at least two pole faces adapted to be located next to the inner wall of the casing pipe; a pair of electrodes individually positioned on opposite sides of one of the two outer transducers and adapted to contact the inner wall of the casing pipe; circuit means for energizing the unidirectional current windings with unidirectional current for altering the permeability of portions of the casing pipe located adjacent each transducer; circuit means for energizing the alternating current windings of the two outer transducers with alternating current for producing in the casing pipe adjacent each of these transducers a longitudinal flow of alternating current, these currents being oppositely directed relative to one another; circuit means coupled to the alternating current windings of the two inner transducers for providing indications of the alternating signals induced therein by the alternating currents flowing in the casing pipe adjacent these transducers; and circuit means responsive to the alternating electrical potential difference produced in the casing pipe between the pair of electrodes for adjusting the magnitude of the alternating current supplied to the intervening transducer for maintaining this electrical potential difference substantially constant.

18. Apparatus for investigating the material exterior to a length of casing pipe lining a borehole extending into the earth comprising: an array of four longitudinally spaced apart electromagnetic transducers adapted for movement through the casing pipe, each transducer including a ferromagnetic core structure having a first alternating current winding and a unidirectional current winding located thereon and having at least two pole faces adapted to be located next to the inner wall of the casing pipe, the two inner transducers each including at least one additional alternating current winding; circuit means for energizing the unidirectional current windings with unidirectional current for altering the permeability of portions of the casing pipe located adjacent each transducer; circuit means for energizing the alternating current windings of the two outer transducers with alternating current for producing in the casing pipe adjacent each of these transducers a longitudinal flow of alternating current, these currents being oppositely directed relative to one another; circuit means coupled to the first alternating current windings of the two inner transducers for providing an indication of the sum of the alternating electrical signals induced therein by the alternating currents flowing in the casing pipe adjacent these transducers; circuit means coupled to the additional alternating current windings of the two inner transducers for providing a signal representative of the difference of the alternating electrical signals induced therein by the alternating currents flowing in the casing pipe adjacent these transducers; and circuit means responsive to the difference signal for adjusting the magnitude of the alternating current supplied to one of the two outer transducers for maintaining the currents flowing in the casing pipe adjacent the two inner transducers substantially equal.

19. Apparatus for investigating the material exeterior to length of casing pipe lining a borehole extending into the earth comprising: an array of four longitudinally spaced apart electromagnetic transducers adapted for movement through the casing pipe, each transducer including a ferromagnetic core structure having alternating and unidirectional currents windings located thereon and having at least two pole faces adapted to be located next to the inner wall of the casing pipe; a center electrode positioned midway between the two inner transducers and a pair of outer electrodes individually positioned in a different one of the regions intermediate adjacent inner and outer transducers, all three electrodes being adapted to contact the inner wall of the casing pipe; circuit means for energizing the unidirectional current windings with unidirectional current for altering the permeability of portions of the casing pipe located adjacent each transducer; circuit means for energizing the alternating current windings of the two outer transducers with alternating current for producing in the casing pipe adjacent each of these transducers a longitudinal flow of alternating current, these currents being oppositely directed relative to one another; first and second circuit means individually coupled to the alternating current windings of different ones of the two inner transducers for individually passing an oppositely directed alternating current between the center electrode and the outer electrode located on the other side of the corresponding inner transducer and for adjusting this current to maintain the net current flow adjacent this transducer substantially equal to zero; and circuit means responsive to the total current supplied to the center electrode for providing an indication of the electrical conductivity of the exterior material intermediate the two inner transducers.

20. An electromagnetic transducer for inducing a flow of alternating current longitudinally in a length of casing pipe lining a borehole extending into the earth comprising: a ferromagnetic core structure having at least two pole faces adapted to be located next to the inner wall of the casing pipe; a coil winding located on the core structure; means for energizing the coil winding with alternating current for producing in a circumferential direction an alternating flux field in the casing pipe; and means for altering the permeability of a circumferential portion of the casing pipe for producing in the casing pipe a flow of alternating current away from the region of the pole faces in a direction longitudinal of the casing pipe.

21. An electromagnetic transducer for inducing a flow of alternating current longitudinally in a length of casing pipe lining a borehole extending into the earth comprising: a ferromagnetic core structure having at least two pole faces adapted to be located next to the inner wall of the casing pipe; a coil winding located on the core structure; means for energizing the coil winding with alternating current for producing an alternating flux field in a circumferential direction in the casing pipe; and means for saturating a circumferential portion of the casing pipe intermediate the pole faces for producing in the casing pipe a flow of alternating current away from the region of the pole faces in a direction longitudinal of the casing pipe.

22. An electromagnetic transducer for inducing a flow of alternating current in a length of casing pipe lining a borehole extending into the earth comprising: a ferromagnetic core structure having at least two pole faces adapted to be located next to the inner wall of the casing pipe, the pole faces being spaced apart around the inner circumference of the casing pipe by an included angle of less than 180°; a coil winding located on the core structure; means for energizing the coil winding with alternating current for producing an alternating flux field in the casing pipe; and means for altering the permeability of a portion of the casing pipe located within the shorter span intermediate the pole faces for producing in the longer pipe span circumferential lines of alternating flux which produce a net flow of alternating current away from the region of the pole faces in a longitudinal direction.

23. An electromagnetic transducer for inducing a flow of alternating current in a length of casing pipe lining a borehole extending into the earth comprising: an E-shaped ferromagnetic core having three pole faces adapted to be located next to the inner wall of the casing pipe, the pole faces being spaced apart around the inner circumference of the casing pipe with the outer two pole faces defining an included angle of less than 180°; at least three coil windings located on the core with a first and second of these windings positioned and interconnected to induce a passage of flux between the outer two pole faces and a third of these windings positioned to induce a passage of flux between the center pole face and the outer two pole faces; means for energizing the first and second of these coil windings with alternating current for producing an alternating flux field in the casing pipe; and means for energizing the third of these coil windings with unidirectional current for saturating the portion of the casing pipe adjacent the center pole face for producing in the casing pipe a flow of alternating current away from the region of the pole faces in a longitudinal direction.

24. An electromagnetic transducer for detecting a flow of alternating current longitudinally in a length of casing pipe lining a borehole extending into the earth comprising: a ferromagnetic core structure having at least two pole faces adapted to be located next to the inner wall of the casing pipe; a coil winding located on the core structure; means for altering the permeability of a circumferential portion of the casing pipe and deflecting a portion of the alternating flux associated with the alternating current flow in the casing pipe into the core structure; and means for providing an indication of the alternating electrical signal induced in the coil winding by such deflected flux.

25. An electromagnetic transducer for detecting a longitudinal flow of alternating current in a length of casing pipe lining a borehole extending into the earth comprising: a ferromagnetic core structure having at least two pole faces adapted to be located next to the inner wall of the casing pipe, the pole faces being spaced apart around the inner circumference of the casing pipe by an included angle of less than 180°; a coil winding located on the core structure; means for saturating a portion of the casing pipe located within the included angle for deflecting a portion of the alternating flux associated with the longitudinal flow of alternating current in the casing pipe into the core structure; and means for providing an indication of the alternating electrical signal induced in the coil winding by such deflected flux.

26. An electromagnetic transducer for detecting a longitudinal flow of alternating current in a length of casing pipe lining a borehole extending into the earth comprising: an E-shaped ferromagnetic core having three pole faces adapted to be located next to the inner wall of the casing pipe, the pole faces being spaced apart around the inner circumference of the casing pipe with the outer two pole faces defining an included angle of less than 180°; at least three coil windings located on the core with a first and second of these windings positioned and interconnected to respond to a passage of flux through the outer legs and back side of the core and a third of these windings positioned to induce a passage of flux between the center pole face and the outer two pole faces; means for energizing the third of these coil windings with unidirectional current for saturating the portion of the casing pipe adjacent the center pole face for deflecting a portion of the alternating flux associated with the longitudinal flow of alternating current in the casing pipe into the core; and means coupled to the first and second of these coil windings for providing an indication of the sum of the alternating electrical signals induced therein by such deflected flux.

27. An electromagnetic transducer for detecting a flow of alternating current in a length of casing pipe lining a borehole extending into the earth comprising: a ferromagnetic core structure having at least two spaced apart core members each having at least two pole faces adapted to be located next to the inner wall of the casing pipe, the corresponding pole faces of the two core members being positioned relatively close to one another; at least one coil winding located on each of the core members; means for energizing the coil winding of one of the core members with unidirectional current for altering the permeability of a portion of the casing pipe in the region intermediate the pole faces thereof for deflecting a portion of the alternating flux associated with the alternating current flow in the casing pipe into the other core member; and means for providing an indication of the alternating electrical signal induced in the coil winding of this other core member by such deflected flux.

28. A method of inducing an alternating electrical potential difference in a length of casing pipe lining a borehole extending into the earth comprising: inducing alternating magnetic flux in a direction circumferential of the casing pipe over a predetermined length thereof intermediate a pair of circumferentially spaced longitudinal axes; and electromagnetically altering the permeability of a portion of the casing pipe intermediate these axes for deflecting the alternating flux around the remainder of the circumference of the casing pipe for producing a net alternating electrical potential difference intermediate the longitudinal extremities of this predetermined length.

29. A method of detecting a longitudinal flow of alternating current in a casing pipe lining a borehole extending into the earth comprising: electromagnetically altering the permeability of a limited circumferential portion of the casing pipe at the longitudinal location of interest for deflecting a portion of the alternating magnetic flux associated with the longitudinal alternating current flow in the casing pipe at this location into the interior region enclosed by such pipe; and detecting the magnitude of the deflected flux.

References Cited by the Examiner

UNITED STATES PATENTS

| | | | |
|---|---|---|---|
| 1,782,462 | 11/1930 | Chappuzeau et al. | 324—37 |
| 2,065,379 | 12/1936 | Knerr et al. | 324—40 |
| 2,320,761 | 6/1943 | Tail et al. | 324—34 |
| 2,353,211 | 7/1944 | Zuschlag | 324—37 |
| 2,415,789 | 2/1947 | Farrow | 324—40 |
| 2,468,154 | 4/1949 | Ashworth et al. | 324—34 |
| 2,527,170 | 10/1950 | Williams. | |
| 2,897,438 | 7/1959 | Fearon | 324—34 |
| 3,091,733 | 5/1963 | Fearon et al. | 324—37 |

WALTER L. CARLSON, *Primary Examiner.*

SAMUEL BERNSTEIN, *Examiner.*

G. R. STRECKER, *Assistant Examiner.*